United States Patent

Garcia

[15] 3,642,299
[45] Feb. 15, 1972

[54] RELEASABLE TOWLINE CONNECTOR DEVICE FOR SKI-BOB

[72] Inventor: George E. Garcia, 987 Bel Marin Keys, Novato, Calif. 94947

[22] Filed: Dec. 29, 1969

[21] Appl. No.: 888,442

[52] U.S. Cl. ................................280/16, 280/24, 280/292, 280/480, 280/504, 9/310 B
[51] Int. Cl. ......................................B62b 13/04, B60d 1/00
[58] Field of Search ................280/16, 21, 480, 24, 292, 504; 9/310 B

[56] References Cited

UNITED STATES PATENTS

| 2,384,185 | 9/1945 | McElhinney | 280/504 |
| 2,721,088 | 10/1955 | Ritter | 280/480 |
| 3,161,416 | 12/1964 | Lechene et al. | 280/21 |
| 3,328,045 | 6/1967 | Davignon | 280/21 |

FOREIGN PATENTS OR APPLICATIONS

| 931,149 | 8/1955 | Germany | 280/480 |
| 257,608 | 4/1949 | Switzerland | 280/16 |

*Primary Examiner*—Leo Friaglia
*Attorney*—Owen, Wickersham & Erickson

[57] ABSTRACT

A device for releasably connecting a vehicle such as a ski-bob to a towing line so that it can be pulled over the snow by a snowmobile or the like in a manner that will enable the rider to traverse and turn with stability and control. The device includes movable gripping members that are closed in one position to retain the towing line and are controllable by the rider's hand to release the towing line whenever desired.

9 Claims, 4 Drawing Figures

PATENTED FEB 15 1972
3,642,299
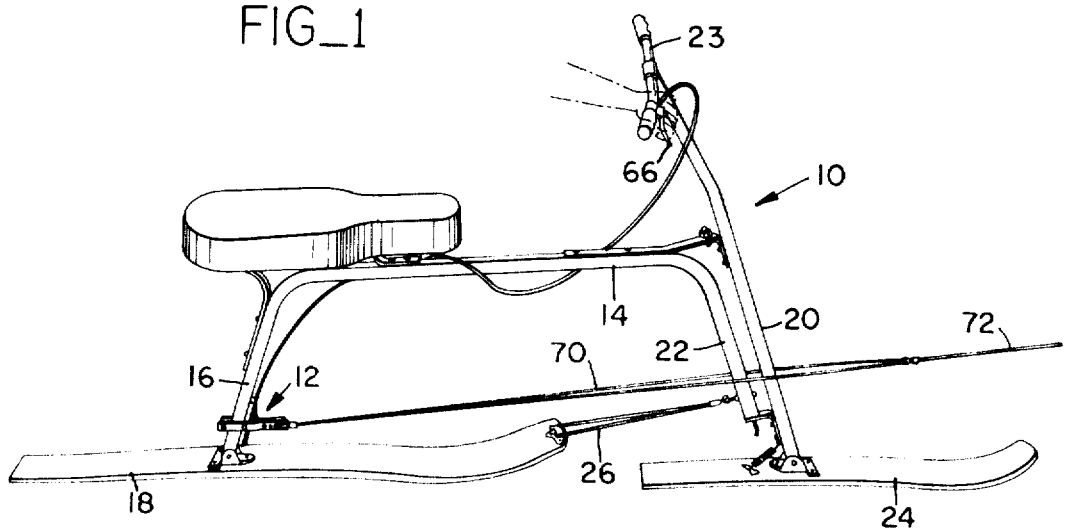
FIG_1
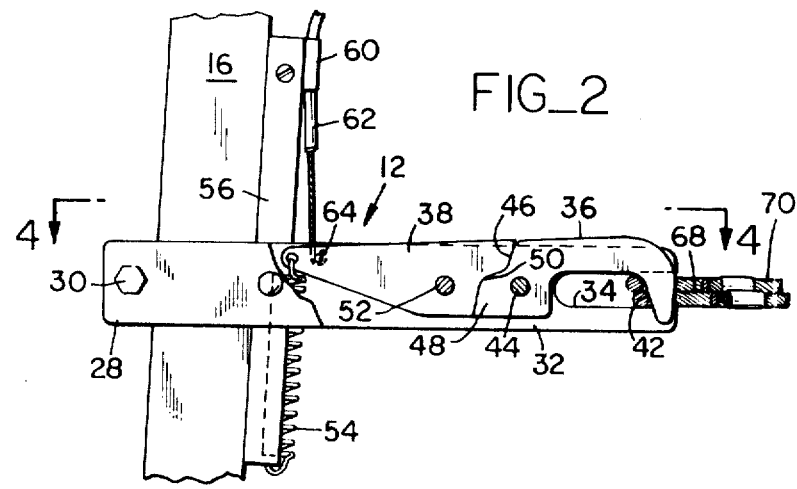
FIG_2
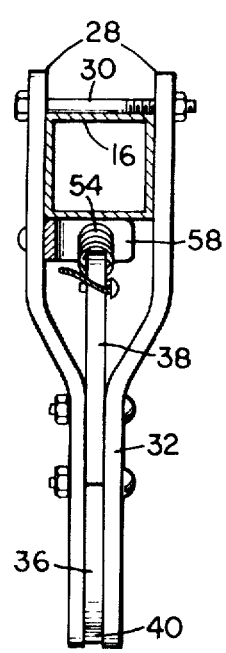
FIG_4
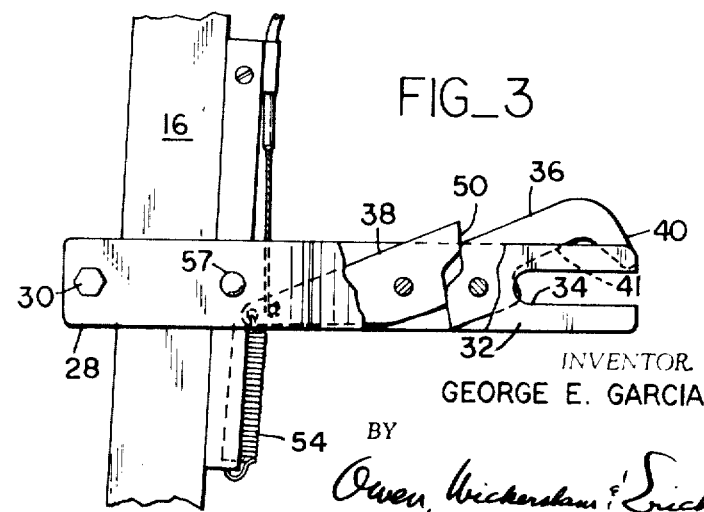
FIG_3
INVENTOR.
GEORGE E. GARCIA
BY Owen, Wickersham & Erickson
ATTORNEYS

3,642,299

RELEASABLE TOWLINE CONNECTOR DEVICE FOR SKI-BOB

This invention relates to a releasable towline-gripping device and more particularly it relates to such a device for use on vehicles adaptable for towing such a ski-bob that is operable on snow.

On snow vehicles called ski-bobs the rider sits above a rear ski which is movable up and down in only a vertical plane and aligned rearwardly behind a steerable front ski. Although ski-bobs commonly move by gravity on downhill slopes it is also desirable to tow them over fairly level terrain by means of a powered vehicles such as a snowmobile, in much the same manner as a boat tows a water skier. Prior to the present invention, attempts to tow snow skiers were generally unsuccessful because of the inherent differences between skiing on water and on snow.

In waterskiing, the skis penetrate the water and although the skier grasps the towline with his hands the towing force is applied through his legs to the skis. Thus, the waterskier essentially pushes himself through the water, thereby enabling him to traverse in wide areas from side to side. Towing a skier in snow on conventional skis is much more difficult, because snow skis cannot penetrate snow like water skis penetrate water. Thus, the snow skier cannot push with his skis and is therefore greatly limited in his ability to traverse and maintain control when being towed. The problem of towing ski-bobs was similar to that of towing conventional snow skiers.

One object of the present invention is to solve the aforesaid problem by providing a towing line connector device in combination with a ski-bob that will enable the ski-bob to be maneuvered with a high degree of control and stability by its rider when towed by another vehicle.

Another object of the present invention is to provide a towing line connector device that can be easily attached to a ski-bob at a location thereon which will enable the ski-bob to be maneuvered with control and stability even at relatively high speeds and over rough terrain.

Yet another object of the present invention is to provide a towing line connector device that affords a high degree of safety in that it enables the rider to release the towing line quickly when desired and automatically release it if the rider's grip on the steering bar member is relaxed.

Another object of the present invention is to provide a towing line connector device that is durable, reliable and yet particularly well adapted for ease and economy of manufacture.

The aforesaid and other objects are accomplished by a device that can be readily attached to the frame of a ski-bob at a location below the ski-bob seat and just above the rear ski. In general, the device comprises a pair of yoke members that are attached to the ski-bob frame at a rear end and extend forwardly from it. The forward ends of these yoke members are spaced apart and have open slots. Pivotally mounted between the yoke members is a movable hooklike means that is normally biased by a spring to an open position. A cable attached to the hooklike member extends to a hand lever on the steering bar of the ski-bob. Easy movement of the hand lever can overcome the spring bias and place the hooklike member in a closed position so that it will prevent the removal of towing line loops from the yoke member slots. Release of the hand lever combined with tension on the towing line loops will quickly cause the loops to pull out of the yoke member slots.

Other objects, advantages and features of the present invention will become apparent from the following detailed description of one embodiment thereof presented with the accompanying drawings, in which:

FIG. 1 is a view in perspective of a snow vehicle with a tow line connector device according to the present invention;

FIG. 2 is an enlarged view in elevation of the connector device of FIG. 1, in the closed position;

FIG. 3 is an enlarged view in elevation view similar to FIG. 2, with the connector device shown in the open position; and FIG. 4 is a view in cross section taken along line 4—4 of FIG. 2.

With reference to the drawing, FIG. 1 shows a ski-bob 10 having a towline connector device 12 embodying the principles of the present invention. The invention may be applicable to and useable on various types of towed vehicles, but is particularly adaptable to ski-bobs used on snow. The particularly ski-bob shown is described in detail in my copending application Ser. No. 748,077 filed July 26, 1968, now U.S. Pat. No. 3,526,412 and comprises generally an inverted U-shaped main frame 14. To the end of a downwardly sloping rear frame portion 16 is a rear ski 18 which is pivotally connected to move in the same vertical plane that includes the main frame 14. A steering column 20 having a pair of handlebars 23 is pivotally connected to a downwardly sloping forward frame portion 22, and a front ski 24 is pivotally connected to the lower end of the steering column. A resiliently yieldable member 26 connects the front end of the rear ski with the forward frame portion 22 so the rear ski will naturally follow the surface contour of the terrain over which the ski-bob is running.

In accordance with the principles of my invention the towline connector device 12 is attached to the rear frame portion near its lower end so that the towing force on the ski-bob is applied to the rear ski and preferably as close to its longitudinal axis as possible. As shown in FIGS. 2–4, the connector is comprised of a pair of straplike yoke members 28 that are spaced apart and bear against opposite sides of the rear frame portion 16. The rear ends of the yoke members extend rearwardly beyond the edge of the frame and are held firmly to it by a single suitable fastener such as a machine screw 30.

Beyond the forward edge of the frame the yoke members curve toward each other and come closer together to form parallel spaced-apart forward portions 32. Extending rearwardly from the extreme forward end of each forward portion is a longitudinally extending open slot 34.

Located between and supported by the forward yoke portions 32 is a movable closure means preferably in the form of a pair of pivotal link members 36 and 38. These members have the same thickness and are arranged in alignment for pivotal movement between the forward portions 32 of the yoke members. The forward link member 36 has a downwardly extending hooklike nose portion 40 that extends between the open slots 34 in a closed position, as shown in FIG. 2. This nose portion is formed by a cutout portion 41 in the forward link member 36 that registers with and provides a transverse opening through the slots 34 when the forward link is parallel with the yoke member in the closed position. On the inside of the nose portion 40 is a sloping surface 42 that is normally at an angle to the longitudinal axis of the towline so that the towline tension creates a tendency to cam the forward link member to an open position. Near its rear end the forward link member 36 is pivotally mounted on a transverse pin 44. The rear edge surface of the forward link member has an irregular profile surface 46 in elevation formed by a lower portion 48 that extends rearwardly from the upper portion directly above it. A forward edge surface 50 of the rear pivotal link member 38 conforms with and engages uniformly the surface 46 of the forward member when the two links are in the closed or two-line retaining position of FIG. 2. Near its forward end the rear link member is pivotally mounted on a transverse pin 52 which is supported by the yoke portion 32. The rear end of the link 38 is connected to one end of a coil spring 54 whose other end is mounted in a small mounting guide bar 56. This guide bar is pivotally mounted by a pin 57 to one of the yoke members 28 and has a bent lower end 58 spaced downwardly from the yoke members to which the lower end of the spring 54 is attached. To the upper end of the guide bar above the yoke members is attached a clamp 60 for a flexible control cable 62. The end of the control cable is fixed to the rear end of the rear link 38 by a screw 64.

The control cable extends through a flexible conduit to a handgrip lever 66 pivotally attached to one end of the steering handle 23. The handgrip lever may be of the well-known type commonly used on bicycles for controlling brakes and it is, therefore, not necessary to describe it in detail. The end of the control cable is attached to a link on the hand lever so that when the hand lever is pressed by the rider against the steering handle during normal operation of the ski-bob when being towed, tension is applied to the control cable. This cable tension applies an upward force on the rear end of the rear link 38, thereby causing its front end 36 to bear downwardly on the protruding lower portion 48 of the front link 36. This holds the front link in the closed position and retains the loops 68 of a towing bridle 70 within the yoke slots 34. The bridle is connected to a suitable towline 72 at some point forwardly of the steering column 20.

When the connector device 12 is installed on a ski-bob the mounting guide bar 56 is placed flush against the rear frame portion 16, as shown in FIG. 2. The length of the spring 54 is such that when the mounting bar is in the transverse position shown relative to the yoke members 28, a preload is applied to the link 38 that tends to move it toward the open position. Thus, when the hand grip lever 66 on the steering handle is released, the preloaded spring 54 pulls the end of rear link member 38 downwardly as it pivots about the pin 52. This also releases the front link member 36 and causes it to move to the open position by pivoting about its own pin 44. The towline pulling on the inner surface 42 of the nose or hook portion 40 of the front link also causes it to open further and release the towline.

The fact that the releasable cable-gripping means is in the form of the two links 36 and 38 enables the nose or hook portion 40 to move from a closed to an open position with a relatively small amount of grip lever action. This provides for quick and positive response of the towline release when such a release is necessary and thus contributes greatly to the safety factor in towing such vehicles as snow-bobs.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A ski-bob comprising a frame with a central portion having front and rear downwardly sloping portions at its opposite ends, a pivotal steering means connected to said front frame portion, a front ski connected to the lower end of said steering means, a rear ski connected to the lower end of said rear frame portion, seat means on said central frame portion located substantial above said rear ski and a towline connector device attached to said rear frame portion above said rear ski and below said seat means.

2. The ski-bob as described in claim 1 wherein said connector device comprises a pair of yoke members having front and rear end portions, means for securing said rear end portions to said rear frame portion, said front end portions being parallel and spaced apart and having longitudinally extending slots at their forward ends, a pair of front and rear link members pivotally mounted in tandem between said front end yoke portions and said front link member having a hooklike nose portion, means on said link members forming a movable connection between them, a spring means connected to said rear link member, preload means for holding said spring means so as to bias said link members toward an open position, and control means for overcoming the preload force of said spring to hold said link members in the closed position when said ski-bob is being towed.

3. The ski-bob as described in claim 2 wherein said preload means comprises a bar member pivotally connected to one of said yoke members and having means at one end for retaining one end of said spring means.

4. The ski-bob as described in claim 1 wherein said towline connector device includes holding means for retaining a towline, and means for releasing said holding means when it is desired to disconnect the ski-bob from the towline.

5. The ski-bob as described in claim 4 wherein said holding means comprises a hooklike link means, spring means for preloading said link means toward an open or release position, and said means for releasing comprises a control cable attached to said link means, hand lever means for applying tension to said control cable when actuated manually to maintain said link means closed, said spring means causing said link means to open when hand lever means are not actuated.

6. The ski-bob as described in claim 5 wherein said steering means includes handlebars fixed to a steering column, said hand lever means being mounted on said handlebars.

7. A towline connector device for use on a towed vehicle comprising:
means for attaching said device to the vehicle;
yoke means including a movable link means for retaining a loop of towline;
spring means for urging said movable link means toward an open position; and
manual control means for counteracting said spring means to maintain said movable means in a closed position.

8. The towline connector device as described in claim 7 wherein said yoke means comprises a pair of elongated members having parallel forward portions spaced equally apart with open slots extending longitudinally from the front ends of said forward portions, said movable link means including front and rear links each pivotally mounted between said forward yoke portions, said front link having a hook portion which is located between said front ends of said forward yoke portions when said device is in the closed position.

9. The device as described in claim 8 wherein said manual control means comprises a cable connected to said rear link, and means for applying tension to said cable for overcoming the force of said spring means to hold said front and rear links in the closed position.

* * * * *